(12) United States Patent
Wang

(10) Patent No.: US 7,008,687 B2
(45) Date of Patent: Mar. 7, 2006

(54) PROTECTIVE STRAP

(76) Inventor: Jack Wang, No. 168-6, Hai Pin Rd., Ching Shui Chen,Taichung Hsien (TW)

(*) Notice: Subject to any disclaimer, the term of this patent is extended or adjusted under 35 U.S.C. 154(b) by 113 days.

(21) Appl. No.: 10/660,669

(22) Filed: Sep. 12, 2003

(65) Prior Publication Data

US 2005/0058808 A1 Mar. 17, 2005

(51) Int. Cl.
*B32B 3/00* (2006.01)
*C21C 5/30* (2006.01)
*B25G 1/01* (2006.01)

(52) U.S. Cl. .................. 428/192; 428/60; 428/157; 428/172; 428/207; 473/302; 473/303; 473/549; 473/568; 74/551.9

(58) Field of Classification Search .............. 428/37, 428/67, 77, 78, 79, 172, 192, 60, 157, 207; 74/551.9, 557; 473/201, 301, 549, 568, 303, 473/302
See application file for complete search history.

(56) References Cited

U.S. PATENT DOCUMENTS

| 2,671,661 | A | * | 3/1954 | Goodwin | 473/302 |
| 5,688,569 | A | * | 11/1997 | Gilmore et al. | 428/31 |
| 5,851,632 | A | * | 12/1998 | Chen et al. | 428/156 |
| 6,234,920 | B1 | * | 5/2001 | Wang | 473/523 |

* cited by examiner

*Primary Examiner*—Donald J. Loney
(74) *Attorney, Agent, or Firm*—Browdy and Neimark, PLLC

(57) ABSTRACT

A protective strap for spirally winding around a handle includes a main body and a distinctive strap. The main body is an elongated strap member having two lateral edges, two end edges, a top side and a bottom side. The two lateral edges of the main body are respectively longer in length than the two end edges of the main body. The distinctive strap is disposed on the top side of the main body, having two lateral fringes and two end fringes shorter in length than the two lateral fringes. The distinctive strap is parallel to one of the lateral edges of the main body and has a width between the two lateral fringes thereof smaller than that between two lateral edges of the main body.

12 Claims, 5 Drawing Sheets

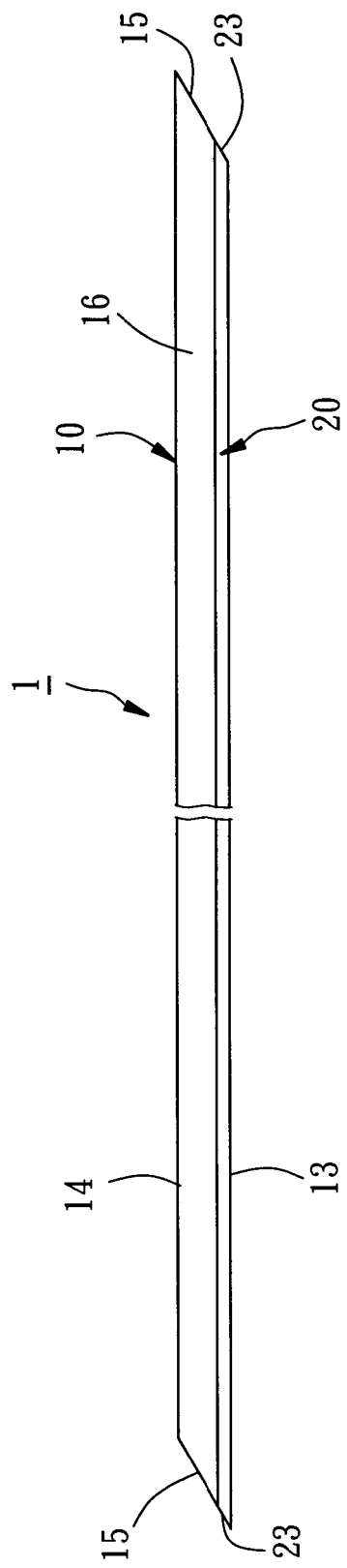
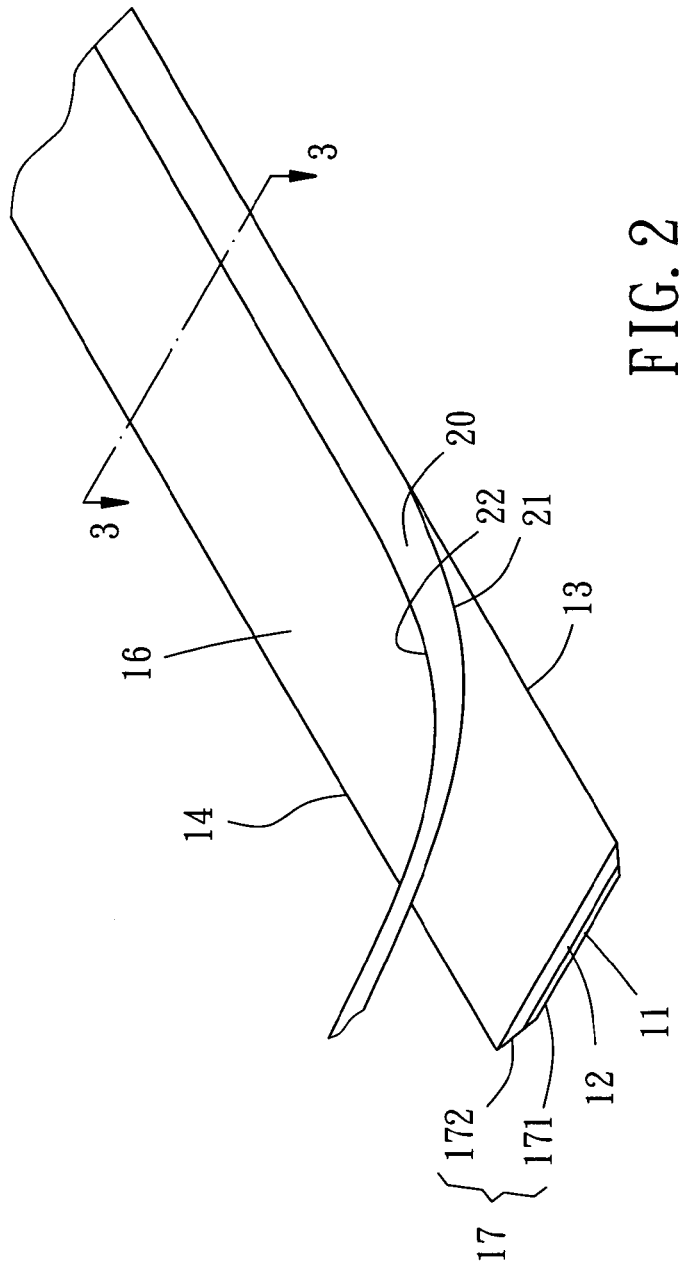

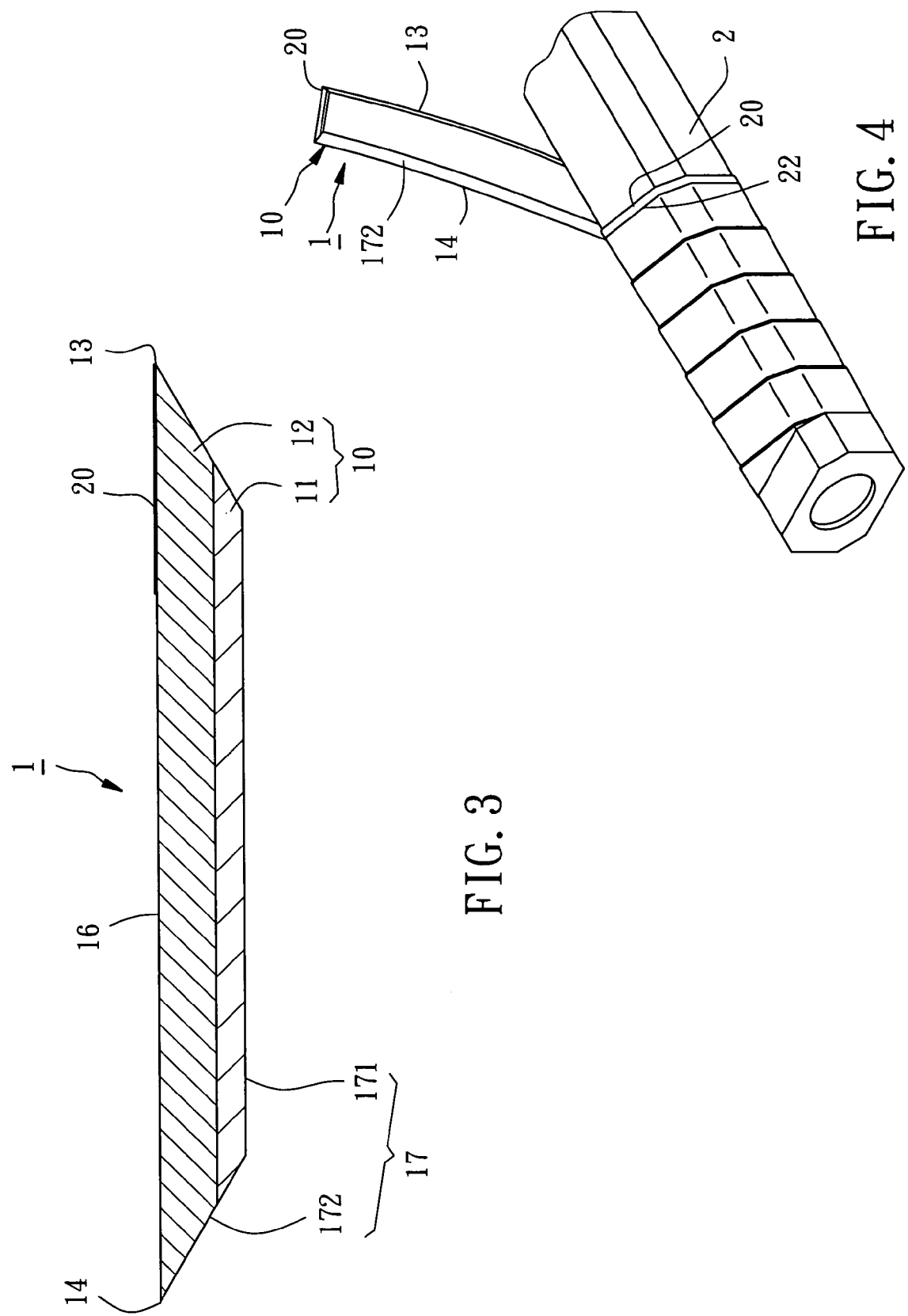

PROTECTIVE STRAP

BACKGROUND OF THE INVENTION

1. Field of the Invention

The present invention relates generally to sporting equipment accessories, and more particularly, to a protective strap adapted to wind around a handle of a sporting apparatus.

2. Description of the Related Art

A conventional protective strap is an elongated strap member, which was formerly made of leather and is currently made of polyurethane (PU) together with fiber fabric, for use in spirally winding around a sporting apparatus, such as a handle of a tennis racket, a golf club, etc., so as to enable the user to hold the grip preferably comfortably.

When the above mentioned protective strap is spirally wound around a handle of a sporting apparatus, a bottom side of a lateral part of the protective strap is successively overlapped on a top side of the other lateral part of the protective strap so as to enable the protective strap to wind around the handle preferably tight.

However, when the user winds the protective strap around the handle, it is very difficult to enable the bottom side of one lateral part of the protective strap to be successively and evenly overlapped on the top side of the other lateral part of the protective strap, i.e. the protective strap is devoid of apparently indicatory marks to enable the bottom side of one lateral part of the protective strap to be unevenly overlapped on the top side of the other lateral part of the protective strap when the user winds the protective strap around the handle. Hence, the aforesaid phenomenon disfigures the appearance of the grip composed of the protective strap wound around the handle, discomforts the user while holding the sporting apparatus, and to further enable the protective strap to easily disengage from the handle.

Further, while the user is holding a sporting apparatus wound around with the conventional protective strap, the perspiration generated from the palms of the user's hands stays on an outer surface of the protective strap to reduce the friction generated between the protective strap and the palms, i.e. the perspiration reduces the maneuverability of the sporting apparatus, and it may worse causes the sporting apparatus to slip away from the user's palms to further damage the sporting apparatus or hurt people.

Another conventional protective strap composed of two coupled elongated straps of different colors is wound around a handle of a sporting apparatus to display the appearance of two colors alternately arranged; however, the protective strap needs more complex processing procedures so as to incur higher production cost.

SUMMARY OF THE INVENTION

The primary objective of the present invention is to provide a protective strap, which bottom side of one lateral part can be easily controlled to evenly overlap on the top side of the other lateral part thereof while winding the protective strap around a handle of a sporting apparatus.

The secondary objective of the present invention is to provide a protective strap, which can rapidly drain the perspiration generated from the user's hands and stayed on the surface thereof while the user holds the grip, in which the protective strap is wound around a handle of a sporting apparatus.

The third objective of the present invention is to provide a protective strap, which can enable the grip to present the appearance of two colors alternately arranged while the protective strap is wound around a handle of a sporting apparatus.

The fourth objective of the present invention is to provide a protective strap, which bottom side of one lateral part can be easily controlled to evenly overlap on the top side of another lateral part thereof, can rapidly drain the perspiration generated from the user's hands and stayed on the surface thereof while the user holds the grip, in which the protective strap is wound around the handle, and can enable the grip to present the appearance of two colors alternately arranged while the protective strap is wound around a handle of a sporting apparatus.

The foregoing objectives of the present invention are attained by the protective strap, which is composed of a main body and a distinctive strap. The main body is an elongated strap member and two lateral edges thereof are respectively longer than the two end edges thereof, having a top side and a bottom side. The distinctive strap is disposed on the top side of the main body and two lateral fringes thereof are respectively longer than the two end fringes thereof, parallel to one lateral edge of the main body. The width between the two lateral fringes of the distinctive strap is smaller than that between the two lateral edges of the main body.

BRIEF DESCRIPTION OF THE DRAWINGS

FIG. 1 is an elevational view of a first preferred embodiment of the present invention;

FIG. 2 is a partially perspective and exploded view of the first preferred embodiment of the present invention;

FIG. 3 is a sectional view taken along a line 3—3 indicated in FIG. 2;

FIG. 4 is a schematic view of the first preferred embodiment of the present invention being wound around a handle of a sporting apparatus;

DETAILED DESCRIPTION OF THE INVENTION

Figure 5:
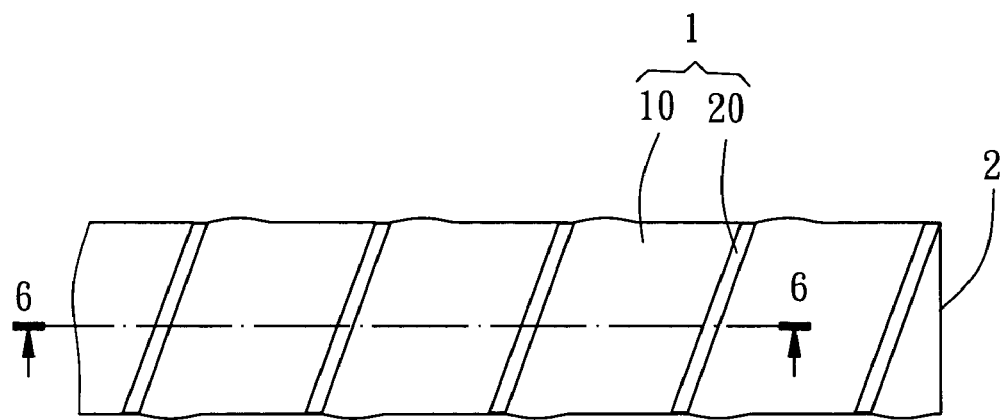
FIG. 5 is a plain view of the first preferred embodiment of the present invention wound around a handle of a sporting apparatus.

Referring to FIGS. 1–3, a protective strap 1 constructed according to a first preferred embodiment of the present invention is composed of a main body 10 and a distinctive strap 20.

The main body 10 is an elongated strap member cut from a piece of nonwoven fabric coated with polyurethane (PU), formed of a nonwoven fabric layer 11 and a PU layer 12 coated on a top side of the nonwoven fabric layer 11. The main body 10 is provided with a first lateral edge 13 and a second lateral edge 14 at bilateral edges thereof, which are respectively longer than two end edges 15 thereof and are parallel to each other. The main body 10 is further provided with a top side 16 and a bottom side 17; the top side 16 coincides a top side of the PU layer 12; the bottom side 17 has a first bottom surface 171 and two second bottom surfaces 172 extending respectively from bilateral edges of the first bottom surface 171 to the bilateral edges of the top side 16.

The distinctive strap 20 is an elongated strap member made of aluminum foil to have a shining surface and includes a first lateral fringe 21 and a second lateral fringe 22 respectively at bilateral fringes thereof; the first and second lateral fringes 21 and 22 are respectively longer than two end fringes 23 of the distinctive strap 20 and are parallel to each other. The width between the first and second lateral fringes 21 and 22 of the distinctive strap 20 is one-fourth of that between the first and second lateral edges 13 and 14 of the main body 10. The distinctive strap 20 has a thickness of 0.05 mm. The distinctive strap 20 is fixedly adhered to the top side 16 of the main body 10, wherein the first lateral fringe 21 abuts the first lateral edge 13 of the main body 10 to enable the distinctive strap 20 to be parallel to the first lateral edge 13 of the main body 10. Briefly, the thickness of the distinctive strap 20 is preferably less than 0.1 mm to avoid turnup incurred by friction generated while the user holds the grip, in which the protective strap 1 is wound around a handle, due to the thickness is excessively large.

Referring to FIG. 4, while the user intends to wind the protective strap 1 around a handle 2 of a sporting apparatus, the user can adhere an end of a bottom side of the protective strap 1 to an initial end of a winding area where the protective strap 1 is to be wound around the handle 2 to enable the first lateral edge 13 of the main body 10 to face a distal end of the winding area, and then successively overlap the second bottom surface 172 abutting the second lateral edge 14 on a lateral part of the distinctive strap 20 to enable the protective strap 1 to be spirally wound around the handle 2.

While the protective strap 1 is spirally wound around the handle 2, the second bottom surface 172 is put to overlap on the distinctive strap 20. When the second lateral edge 14 of the main body 10 keeps a distance from the second lateral fringe 22 of the distinctive strap 20, the distinctive strap 20 can evenly overlap on the main body 1. Hence, the distinctive strap 20 can function as an indicatory mark for the overlapping degree while the protective strap 1 is wound around the handle 2.

The distance between the second lateral edge 14 of the main body 10 and the second lateral fringe 22 of the distinctive strap 20 is preferably less than 3 mm, thereby effectively preventing the distinctive strap 20 from the turnup due to the distance is excessively large.

Referring to FIG. 5, while the protective strap 1 is wound around the handle 2, the other lateral part of the distinctive strap 20 is exposed outside to enable the protective strap 1 to form an appearance of two alternately arranged colors. Further, the distinctive strap 20 is directly adhered to the main body 1, such that the protective strap 1 can be easily processed to render low production cost.

Figure 6:
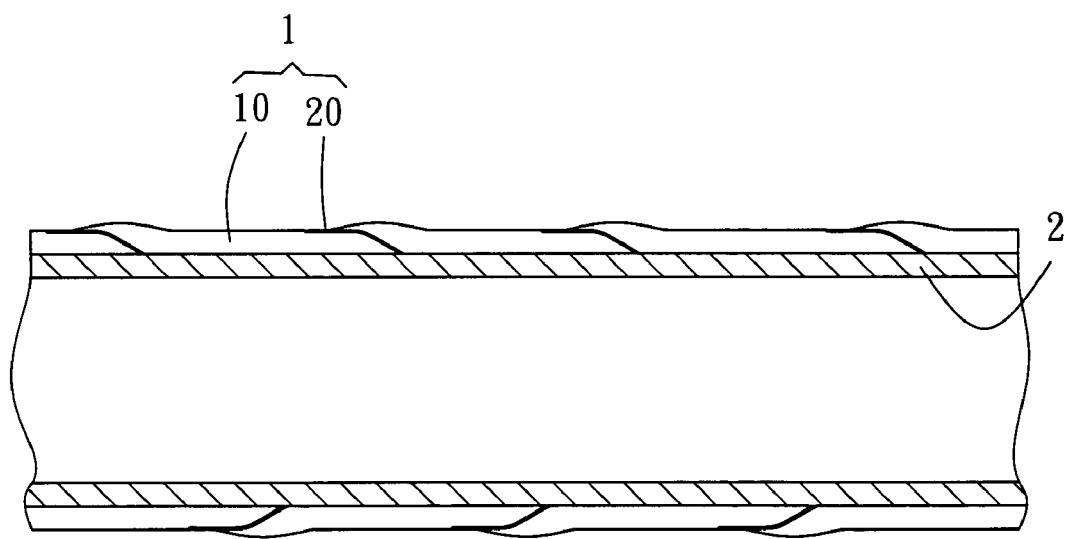
FIG. 6 is a sectional view taken along a line 6—6 indicated in FIG. 5.

Referring to FIG. 6, the overlap of the protective strap 1 where the distinctive strap 20 is positioned is convex to enable the surface of the protective strap 1 to be concavoconvex, such that the perspiration generated by the user's hands will rapidly flow through the overlap of the protective strap 1 and further converge on the concavoconvex surface of the distinctive strap 20. Because the distinctive strap 20 embodied as an aluminum strap has a smooth surface, the perspiration fails to remain on the smooth surface to be easily threw off while the user swings the handle 2, thereby keeping the surface of the protective strap 1 dry.

Briefly, the protective strap of the first preferred embodiment of the present invention includes advantages and effects as follows.
1. While the user winds the protective strap around the handle, the distinctive strap provides the indicatory mark for the overlapping degree while the protective strap 1 is wound around the handle 2.
2. When the protective strap is completely wound around the handle, the distinctive strap enables the protective strap to present the appearance of two alternately arranged colors.
3. When the user holds the grip, the distinctive strap can rapidly drain the perspiration.
4. It is easy to mount the distinctive strap on the main body to manufacture the protective strap, such that the production cost of the protective strap is quite low.

Practically, the protective strap 1 can be made of leather, rubber, or other materials; the distinctive strap 20 can be made of leather, rubber, PU, or other materials. In addition, the distinctive strap 20 can be alternatively produced by printing or paint coating on the main body 10.

Figure 7:
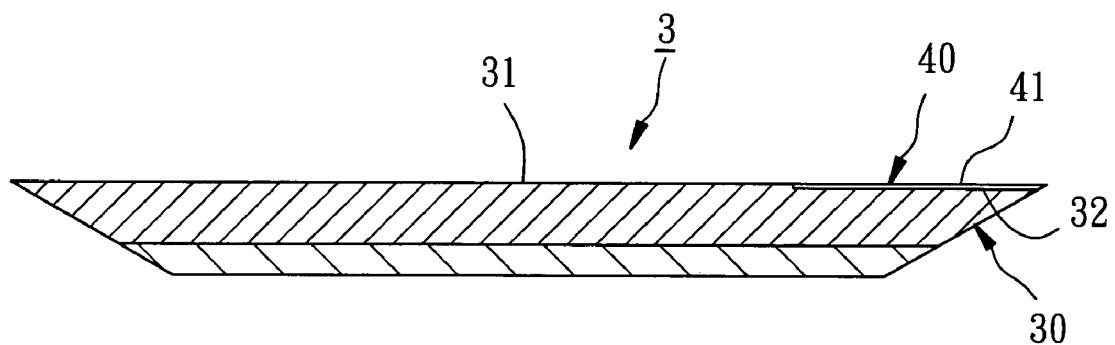
FIG. 7 is a sectional view of a second preferred embodiment of the present invention.

Referring to FIG. 7, the protective strap 3 of a second preferred embodiment of the present invention is also composed of a main body 30 and a distinctive strap 40. The main body 30 is provided with a top side 31 and a recessed portion 32 positioned at a lateral part of the top side 31; the width of the distinctive strap 40 is substantially identical to that of the recessed portion 32, and the distinctive strap 40 is adhered to the recessed portion 32 to enable a top surface 41 of the distinctive strap 40 to be flush with the top side 31 of the main body 30, thereby preventing the distinctive strap 40 from turnup and departure from the main body 30 incurred by the friction when the user holds the grip.

Figure 8:
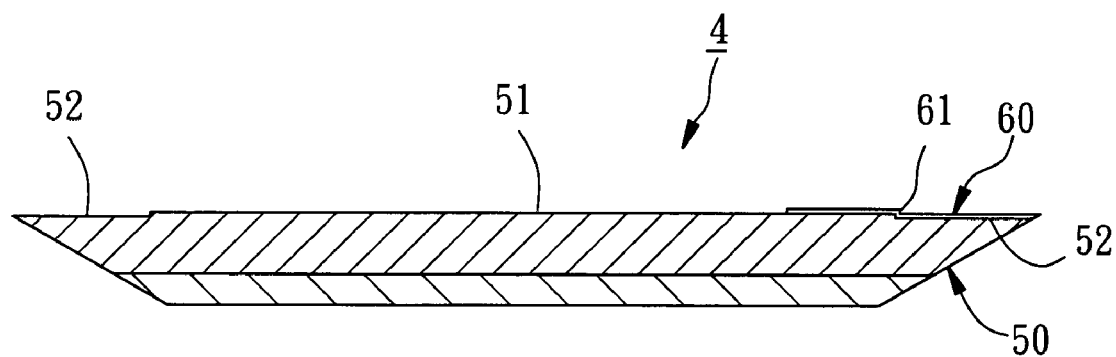
FIG. 8 is a sectional view of a third preferred embodiment of the present invention.

Referring to FIG. 8, the protective strap 4 of a third preferred embodiment of the present invention is also composed of a main body 50 and a distinctive strap 60. The main body 50 is provided with a top side 51 and two recessed portions 52 positioned at bilateral parts of the top side 51. Each of the two recessed portions 52 is less in width than the distinctive strap 60 and the distinctive strap 60 adhesively covered on one of the two recessed portions 52 and a lateral part of the top surface 51, such that a stepped portion 61 is formed on the distinctive strap 60 to enhance the indicatory marks for the overlapping degree while the protective strap 4 is wound around a handle of a sporting apparatus.

Figure 9:
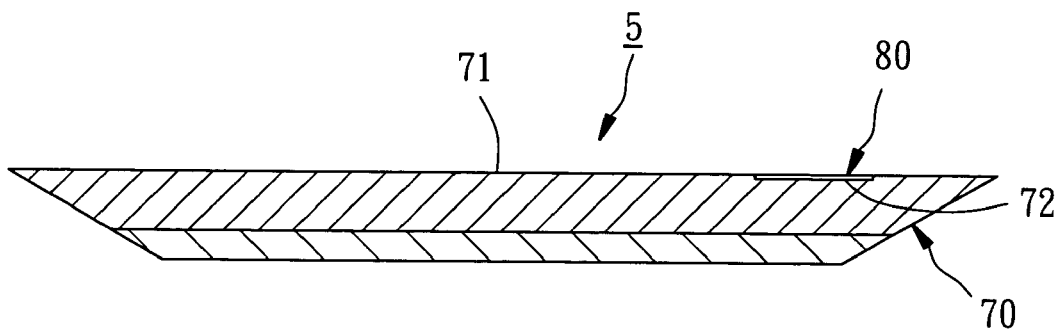
FIG. 9 is a sectional view of a fourth preferred embodiment of the present invention.
Figure 10:
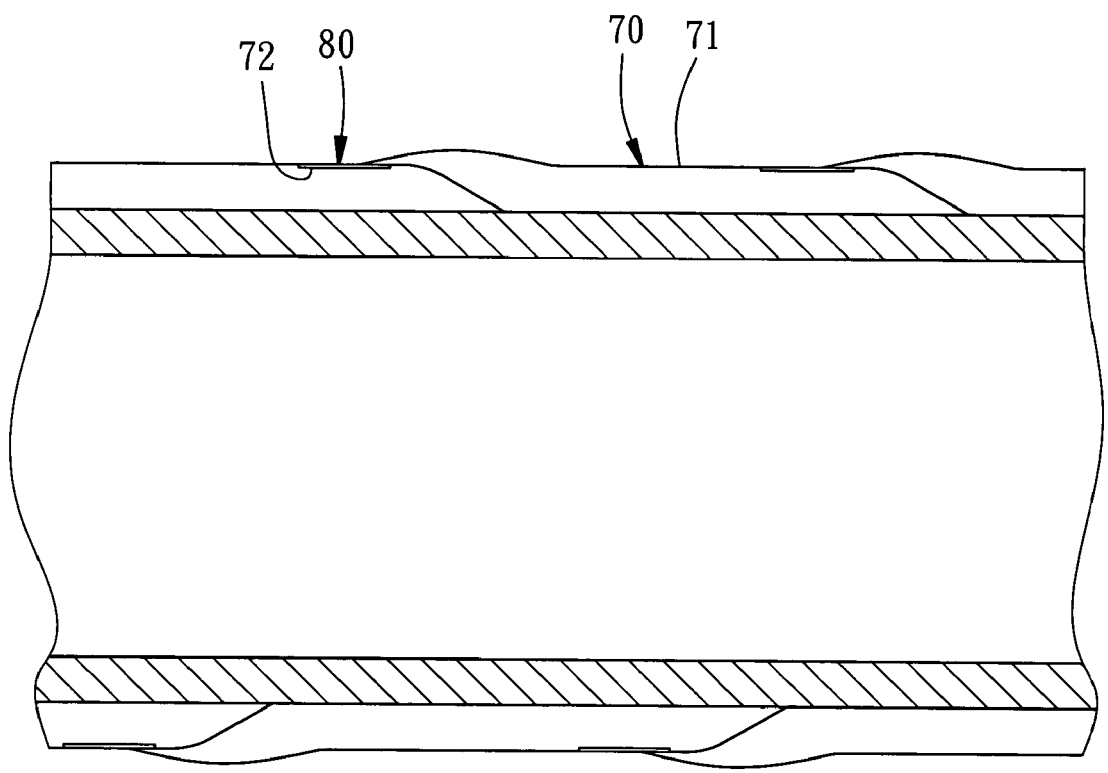
FIG. 10 is a sectional view of the fourth preferred embodiment of the present invention wound around a handle of a sporting apparatus.

Referring to FIGS. 9 and 10, the protective strap 5 of a fourth preferred embodiment of the present invention is also composed of a main body 70 and a distinctive strap 80. The main body 70 is provided with a top side 71 and a recessed portion 72 positioned in proximity of an edge of the top side 71. The distinctive strap 80 is adhered to the recessed portion 72 and is at a distance from the edge of the top side 71. Accordingly, while the protective strap 5 is wound around the handle, a lateral part of the main body 70 between the edge of the top side 71 and the distinctive strap 80 can be used as indicatory marks for the overlapping degree.

What is claimed is:
1. A protective strap for use in spirally winding around a handle, said protective strap comprising;
   a main body being an elongated strap member having two lateral edges, two end edges, a top side and a bottom side, each of said two lateral edges being longer in length than each of said two end edges;
   a distinctive strap disposed on said top side of said main body and having two lateral fringes and two end fringes, said two lateral fringes being respectively longer in length than said two end fringes, the width between said two lateral fringes of said distinctive strap being smaller than that between said two lateral edges of said main body, said distinctive strap being parallel to one of said two lateral edges of said main body, and at least one recessed portion at a side of said top side of the main body, the at least one recessed portion being less in width than said distinctive strap, such that said distinctive strap is engaged in the at least one recessed portion and on a part of said top side to form a stepped portion on said distinctive strap.

2. The protective strap as defined in claim 1, wherein said main body comprises a nonwoven fabric layer and a polyurethane (PU) layer coated on a top surface of said nonwoven layer, said top side of said main body coinciding a top surface of said PU layer.

3. The protective strap as defined in claim 1, wherein said bottom of said main body comprises a first bottom surface and two second bottom surfaces respectively extending from bilateral ledges of said first bottom side to bilateral edges of said top side.

4. The protective strap as defined in claim 1, wherein said distinctive strap is an elongated aluminium strap having a shining surface and is fixedly adhered to said main body.

5. The protective strap as defined in claim 1, wherein the width between said two lateral fringes of said distinctive strap is one-fourth of that between said two lateral edges of said main body.

6. The protective strap as defined in claim 1, wherein said distinctive strap abuts one of said two lateral edges of said main body at one of said two lateral fringes thereof.

7. The protective strap as defined in claim 1, wherein said distinctive strap has a thickness of no more than 0.1 mm.

8. The protective strap as defined in claim 1, wherein said distinctive strap has a thickness of 0.05 mm.

9. The protective strap as defined in claim 1, wherein one of said two lateral edges of said main body is at a distance of less than 3 mm from one of said two lateral fringes of said distinctive strap after said protective strap is completely wound around the handle.

10. The protective strap as defined in claim 1, wherein said main body comprises two recessed portions positioned respectively at bilateral sides of said top side thereof, and each of said two recessed portions being less in width than said distinctive strap, such that said distinctive strap is adhered to one of said recessed portions and a part of said top side to form a stepped portion on said distinctive strap.

11. The protective strap as defined in claim 1, wherein said distinctive strap is directly printed on said top side of said main body.

12. The protective strap as defined in claim 1, wherein said distinctive strap is directly paint-coated on said top side of said main body.

* * * * *